United States Patent
Chase et al.

(10) Patent No.: US 12,281,246 B2
(45) Date of Patent: Apr. 22, 2025

(54) TWO-COMPONENT POLYURETHANE FOAM ADHESIVE, A PROCESS FOR PREPARING THE SAME AND AN ARTICLE MADE THEREFROM

(71) Applicant: BASF SE, Ludwigshafen am Rhein (DE)

(72) Inventors: Thomas Chase, Wyandotte, MI (US); Todd W. Wishneski, Missouri City, TX (US); Matthew Freeman, Spring, TX (US); Marcus J. Hunter, Houston, TX (US); Joshua James Belill, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 107 days.

(21) Appl. No.: 17/754,817

(22) PCT Filed: Oct. 6, 2020

(86) PCT No.: PCT/EP2020/077896
§ 371 (c)(1),
(2) Date: Apr. 13, 2022

(87) PCT Pub. No.: WO2021/073926
PCT Pub. Date: Apr. 22, 2021

(65) Prior Publication Data
US 2023/0399555 A1     Dec. 14, 2023

Related U.S. Application Data

(60) Provisional application No. 62/915,731, filed on Oct. 16, 2019.

(30) Foreign Application Priority Data

Nov. 12, 2019 (EP) .................................. 19208459

(51) Int. Cl.
*C09J 175/08* (2006.01)
*C09J 5/08* (2006.01)

(52) U.S. Cl.
CPC ............... *C09J 175/08* (2013.01); *C09J 5/08* (2013.01); *C09J 2301/20* (2020.08); *C09J 2301/312* (2020.08); *C09J 2301/50* (2020.08)

(58) Field of Classification Search
CPC ........ C09J 175/08; C09J 5/08; C09J 2301/20; C09J 2301/312; C09J 2301/50; C08G 18/10; C08G 18/12; C08G 18/3206; C08G 18/4808; C08G 18/4812; C08G 18/4816; C08G 18/4825; C08G 18/4829; C08G 18/7664; C08G 18/7671; C08G 18/4841; C08G 18/48
See application file for complete search history.

(56) References Cited

U.S. PATENT DOCUMENTS

| | | | |
|---|---|---|---|
| 4,996,812 A | 3/1991 | Venable | |
| 5,872,203 A | 2/1999 | Wen et al. | |
| 6,008,263 A * | 12/1999 | Thompson | C08G 18/4866 568/624 |
| 6,130,268 A | 10/2000 | Murray | |
| 6,416,854 B2 | 7/2002 | Hunter, Jr. | |
| 7,622,187 B2 | 11/2009 | Clarke et al. | |
| 2014/0127448 A1* | 5/2014 | Miller | E04D 11/02 428/317.5 |
| 2016/0017086 A1* | 1/2016 | Grossman | C08G 18/632 521/131 |

FOREIGN PATENT DOCUMENTS

| | | |
|---|---|---|
| EP | 0609982 A1 | 8/1994 |
| WO | 2019089237 A1 | 5/2019 |

OTHER PUBLICATIONS

"Jeffol(R) Polyether Polyols, Enhancing High Performance Polyurethanes" Huntsman International LLC, copyright 2021 (Year: 2021).*
"Mondur (R) 582" Data Sheet, Covestro Edition Nov. 29, 2017 (Year: 2017).*
"Monument Chemical Our Polyols Portfolio," monumentchemical.com, effective Dec. 2023 (Year: 2023).*
"Unofficial Technical Data Sheet RUBINATE(R) 9272 Moisture-Cured Diphenylmethane Diisocyanate Prepolymers," distributed by TRiiSO (Year: 2024).*
International Search Report and Written Opinion for corresponding PCT/EP2020/077896, mailed Feb. 11, 2021, 10 Pages.
European Search Report for EP Patent Application No. 19208459.8, Issued on Apr. 14, 2020, 3 pages.
Chinese Office Action dated May 24, 2023, in Chinese Application No. 202080056614.5, 5 pages.

* cited by examiner

*Primary Examiner* — Cynthia L Schaller
(74) *Attorney, Agent, or Firm* — Baltazar Gomez

(57) ABSTRACT

Described herein is a two-component polyurethane foam adhesive, a process for preparing the same and an article made therefrom.

17 Claims, No Drawings

TWO-COMPONENT POLYURETHANE FOAM ADHESIVE, A PROCESS FOR PREPARING THE SAME AND AN ARTICLE MADE THEREFROM

CROSS-REFERENCE TO RELATED APPLICATIONS

This application is a U.S. National Phase Application of PCT/EP2020/077896, filed Oct. 6, 2020, which claims the benefit of priority to U.S. Provisional Patent Application No. 62/915,731, filed Oct. 16, 2019, and which claims the benefit of priority to European Patent Application No. 19208459.8, filed Nov. 12, 2019, the entire contents of each are hereby incorporated by reference herein.

FIELD OF INVENTION

The present invention relates to a two-component polyurethane foam adhesive, a process for preparing the same and an article made therefrom.

BACKGROUND OF THE INVENTION

Adhesive bonding is an essential technique, without which many products could not be manufactured economically. Advantages of adhesive bonding include, such as but not limited to, parts to be joined not being damaged by thermal stress (for e.g. welding), joining of different materials possible and the forces acting on the bonded surface being spread wide across the whole area.

Polyurethane (PU) foam adhesives have been known for bonding substrates. Prepolymers, also known as isocyanate prepolymers, containing free isocyanate groups play a major role in PU chemistry. The prepolymer is a polyol reacted with excess of isocyanates. One such adhesive based on prepolymer has been described in U.S. Pat. No. 7,622,187 B2 for roof structure application. Adhesives with % elongation of about 200% and 150% at 20 psi have been obtained by reacting polyols having molecular weight of at least 3000 g/mol and prepolymers having isocyanate content of less than 25 wt.-%.

Another U.S. Pat. No. 5,872,203 A describes PU adhesive composition for use in adhering together polymeric roofing membranes to roof-deck substrates. A first component comprises monomeric or polymeric isocyanate having isocyanate content of about 33 wt.-% or a prepolymer having isocyanate content ranging between 0.2 wt.-% to 10 wt.-%.

Another U.S. Pat. No. 6,416,854 B2 describes a sprayable low rise PU foam adhesive for monolithic roofing surface membrane. Thickness of the membrane as low as one quarter inch have been obtained with the low rise adhesives in combination with a silicone-based coating.

EP 0 609 982 A1 describes a novel polyol and a process for preparing a flexible polyurethane foam from a special class of polyols. Another U.S. Pat. No. 6,130,268 describes a two component polyurethane adhesive and a method of bonding various types of construction materials.

Although, PU foam adhesives for specific applications are known, for e.g. fleeceback membranes for roofing, there is no disclosure for a PU foam adhesive that can be applied on a wide variety of substrates and is obtainable through multiple equipment configurations, for e.g. low pressure (~100-200 psi) as well as high pressure (~1000 psi). The existing adhesives are either obtainable at low pressures or at high pressures, i.e. limited in terms of process, and are not obtainable using any of the two. Moreover, the existing PU foam adhesives lack the required toughness and durability to withstand high stress conditions, without compromising on the mechanical properties, such as but not limited to, tensile strength, % elongation and tear strength.

It was, therefore, an object of the presently claimed invention to provide a PU foam adhesive which is universally applicable, i.e. can be applied on a wide variety of substrates, is obtainable through multiple equipment configurations, has improved toughness and durability with acceptable mechanical properties.

SUMMARY OF THE INVENTION

Surprisingly, it has been found that the above object is met by the present invention as described hereinbelow and as reflected in the claims.

Accordingly, in one aspect, the presently claimed invention is directed to a two-component polyurethane foam adhesive comprising:
(A) an isocyanate prepolymer component, obtained by mixing
  (A1) at least one first polyether polyol having an average functionality in between 1.9 to 3.5 and a hydroxyl number in between 10 mg KOH/g to 100 mg KOH/g, and
  (A2) at least one polymeric isocyanate,
  wherein the isocyanate prepolymer has an isocyanate content in between 15 wt.-% to 28 wt.-%,
  and
(B) an isocyanate reactive component comprising
  (B1) 50 wt.-% to 90 wt.-% based on the total weight of the isocyanate reactive component of a second polyether polyol having an average functionality in between 1.9 to 3.5 and a hydroxyl number in between 10 mg KOH/g to 40 mg KOH/g, and
  (B2) 0.5 wt.-% to 30 wt.-% based on the total weight of the isocyanate reactive component of a third polyether polyol having an average functionality in between 1.9 to 8.0 and a hydroxyl number in between 40 mg KOH/g to 1000 mg KOH/g.

In another aspect, the presently claimed invention is directed to a process for preparing the above two-component polyurethane foam adhesive by mixing the isocyanate prepolymer component (A) with the isocyanate reactive component (B) at an isocyanate index in between 70 to 200.

In yet another aspect, the presently claimed invention is directed to an article comprising at least one first substrate layer and one second substrate layer, wherein the above two-component polyurethane foam adhesive layer is present in between the first substrate layer and the second substrate layer of the article and forms an adhesive bond between them.

In still another aspect, the presently claimed invention is directed to a method for producing the above article, said method comprising the steps of:
(S1) applying the two-component polyurethane foam adhesive at least partially onto the at least one first substrate layer, and
(S2) applying the second substrate layer onto the at least one first substrate layer and allowing the two-component polyurethane foam adhesive to solidify to obtain the article.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the present invention will be limited only by the appended claims.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention, and form different embodiments, as would be understood by those in the art. For example, in the appended claims, any of the claimed embodiments can be used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

An aspect of the present invention is embodiment 1, directed to a two-component PU foam adhesive comprising:
(A) an isocyanate prepolymer component, obtained by mixing
  (A1) at least one first polyether polyol having an average functionality in between 1.9 to 3.5 and a hydroxyl number in between 10 mg KOH/g to 100 mg KOH/g, and
  (A2) at least one polymeric isocyanate, wherein the isocyanate prepolymer has an isocyanate content in between 15 wt.-% to 28 wt.-%, and
(B) an isocyanate reactive component comprising
  (B1) 50 wt.-% to 90 wt.-% based on the total weight of the isocyanate reactive component of a second polyether polyol having an average functionality in between 1.9 to 3.5 and a hydroxyl number in between 10 mg KOH/g to 40 mg KOH/g, and
  (B2) 0.5 wt.-% to 30 wt.-% based on the total weight of the isocyanate reactive component of a third polyether polyol having an average functionality in between 1.9 to 8.0 and a hydroxyl number in between 40 mg KOH/g to 1000 mg KOH/g.

In the present context, the isocyanate prepolymer component (A) can be alternately also referred to as A-side component, while the isocyanate reactive component (B) as B-side component.

Isocyanate Prepolymer Component

In one embodiment, the isocyanate prepolymer component in the embodiment 1 is obtained by mixing the first polyether polyol and the polymeric isocyanate. The isocyanate prepolymer has an isocyanate content in between 15 wt.-% to 28 wt.-%. In another embodiment, the isocyanate content is in between 20 wt.-% to 23 wt.-%.

First Polyether Polyol

In another embodiment, the first polyether polyol in the embodiment 1 has an average functionality in between 1.9 to 3.5 and a hydroxyl number in between 10 mg KOH/g to 100 mg KOH/g. In yet another embodiment, the first polyether polyol has an average functionality in between 2.0 to 3.5, or in between 2.0 to 3.2. In still another embodiment, the hydroxyl number is in between 15 mg KOH/g to 100 mg KOH/g, or in between 15 mg KOH/g to 90 mg KOH/g, or in between 20 mg KOH/g to 90 mg KOH/g, or in between 20 mg KOH/g to 80 mg KOH/g. In yet another embodiment, it is in between 20 mg KOH/g to 70 mg KOH/g, or in between 20 mg KOH/g to 60 mg KOH/g, or in between 20 mg KOH/g to 50 mg KOH/g, or in between 20 mg KOH/g to 40 mg KOH/g, or in between 20 mg KOH/g to 35 mg KOH/g, or in between 25 mg KOH/g to 35 mg KOH/g.

In another embodiment, the first polyether polyol in the embodiment 1 comprises at least one alkylene oxide capped polyether polyol. Suitable polyether polyols are formed by the addition of alkylene oxide to polyfunctional starter molecules. The addition of the alkylene oxide is usually performed in an alkaline medium with sodium hydroxide as the base. Such methods are known to a person skilled in the art. Key properties of the first polyether polyol, such as the melting point, viscosity and compatibility can be controlled by the ratio of different alkylene oxides.

In one embodiment, suitable starter molecules include amine containing and hydroxyl-containing starter molecules. Suitable amine containing starter molecules include, for example, aliphatic and aromatic diamines such as ethylenediamine, propylenediamine, butylenediamine, hexamethylenediamine, phenylenediamines, toluenediamine, diaminodiphenylmethane and isomers thereof.

Other suitable starter molecules further include alkanolamines, e.g. ethanolamine, N-methylethanolamine and N-ethylethanolamine, dialkanolamines, e.g., diethanolamine, N-methyldiethanolamine and N-ethyldiethanolamine, and trialkanolamines, e.g., triethanolamine, and ammonia.

Hydroxyl-containing starter molecules are selected from sugars, sugar alcohols, for e.g. glucose, mannitol, sucrose, pentaerythritol, sorbitol; polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water or a combination thereof.

In one embodiment, the hydroxyl-containing starter molecule is selected from sugar and sugar alcohols such as sucrose, sorbitol, glycerol, pentaerythritol, trimethylolpropane and mixtures thereof. In another embodiment, the hydroxyl-containing starter molecule is selected from sucrose, glycerol, pentaerythritol and trimethylolpropane.

In yet another embodiment, the hydroxyl-containing starter molecule comprises glycerol and/or propylene glycol.

Suitable alkylene oxides have 2 to 4 carbon atoms, for example, ethylene oxide, propylene oxide, tetrahydrofuran, 1,2-butylene oxide, 2,3-butylene oxide and styrene oxide. Alkylene oxides can be used singly, alternatingly in succession or as mixtures. In one embodiment, the alkylene oxides are propylene oxide and/or ethylene oxide.

In one embodiment, the at least one alkylene oxide capped polyether polyol has the alkylene oxide content of less than 25.0 wt.-% based on the total weight of the polyether polyol. In another embodiment, the alkylene oxide content is in between 5.0 wt.-% to 25.0 wt.-%, or in between 10.0 wt.-% to 25.0 wt.-%.

In another embodiment, the first polyether polyol in the embodiment 1 has an average functionality of 3.0 and hydroxyl number in between 26 mg KOH/g to 30 mg KOH/g comprising glycerol as the starter molecule with propylene oxide and end capping of ethylene oxide, wherein the ethylene oxide content is in between 12.0 wt.-% to 15.0 wt.-%.

In yet another embodiment, the first polyether polyol in the embodiment 1 has an average functionality of 2.0 and hydroxyl number in between 28 mg KOH/g to 30 mg KOH/g comprising propylene glycol as the starter molecule with propylene oxide and end capping of ethylene oxide, wherein the ethylene oxide content is in between 18.0 wt.-% to 23.0 wt.-%.

In another embodiment, a mixture of the first polyether polyols may also be used for obtaining the isocyanate prepolymer in the embodiment 1.

In still another embodiment, the isocyanate prepolymer component in the embodiment 1 comprises of other polyether polyols in addition to the first polyether polyol. Suitable other polyether polyols include, such as but not limited to, the second polyether polyol and the third polyether polyol, as described herein.

Polymeric Isocyanate

Unlike the existing two-component PU foam adhesives, the present invention makes use of polymeric isocyanate for obtaining the isocyanate prepolymer component in the embodiment 1. By the term "polymeric", it is referred to the polymeric grade of the isocyanates comprising, independently of each other, different oligomers and homologues.

In one embodiment, the polymeric isocyanate in the embodiment 1 has an isocyanate functionality in between 2.5 to 4.0. In another embodiment, it is in between 2.5 to 4.0, or in between 2.5 to 3.5, or in between 2.5 to 3.0.

In another embodiment, the polymeric isocyanate in the embodiment 1 comprises polymeric aromatic isocyanate. Suitable polymeric isocyanate include the polymeric grade of aromatic isocyanates selected from toluene diisocyanate, methylene diphenyl diisocyanate, m-phenylene diisocyanate, 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyl-diphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate, tolidine diisocyanate and 1,3,5-triisopropyl benzene-2,4,6-triisocyanate. It is to be understood here that the polymeric isocyanate in the embodiment 1 is not limited by the isocyanates listed above and further includes other isomers not explicitly mentioned here. For instance, methylene diphenyl diisocyanate implies that the isomers are inherently included. Moreover, a mixture of the polymeric isocyanates, as listed above, can also be used.

In yet another embodiment, the polymeric isocyanate in the embodiment 1 is selected from the polymeric grades of toluene diisocyanate, methylene diphenyl diisocyanate, m-phenylene diisocyanate, 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate and 1-ethyl-4-ethoxy-phenyl-2,5-diisocyanate.

In a further embodiment, the polymeric isocyanate in the embodiment 1 is selected from the polymeric grades of toluene diisocyanate, methylene diphenyl diisocyanate, m-phenylene diisocyanate, 1,5-naphthalene diisocyanate; 4-chloro-1; 3-phenylene diisocyanate; 2,4,6-toluylene triisocyanate, 1,3-diisopropylphenylene-2,4-diisocyanate; 1-methyl-3,5-diethylphenylene-2,4-diisocyanate and 1,3,5-triethylphenylene-2,4-diisocyanate.

In a still further embodiment, the polymer isocyanate in the embodiment 1 comprises polymeric methylene diphenyl diisocyanate (MDI). MDI is available in three different isomeric forms, namely 2,2'-MDI, 2,4'-MDI and 4,4'-MDI. Polymeric MDI includes oligomeric specifies and MDI isomers. Thus, polymeric MDI may contain a single MDI isomer or isomeric mixture of two or three MDI isomers, the balance being oligomeric species. The isomeric ratio as well as the amount of oligomeric species can vary in wide ranges in the polymeric MDIs. For instance, polymeric MDI may typically comprise 30 wt.-% to 80 wt.-% of MDI isomers comprising a mixture of 2,2'-MDI, 2,4'-MDI and/or 4,4'-MDI, the balance being oligomeric species.

Further, the polymeric isocyanate in the embodiment 1 also include the isocyanates that have been modified in the known manner by the introduction of urethane, allophanate, urea, biuret, carbodiimide, uretonimine, isocyanurate and/or oxazolidone residues. These modified isocyanates are well known in the art and are prepared by reactions known to the person skilled in the art. For example, the uretonimine-carbodiimide-modified polymeric isocyanate can be obtained by employing well-known carbodiimide-promoting catalysts which convert the isocyanates to carbodiimide at temperatures ranging between 50° C. to 250° C., which then proceeds to react further with unconverted isocyanates at room temperature to form uretonimine-modified isocyanate.

In one embodiment, the isocyanate prepolymer in the embodiment 1 is obtained by mixing (A1) the first polyether polyol having an average functionality of 3.0 and hydroxyl number in between 26 mg KOH/g to 30 mg KOH/g comprising glycerol as the starter molecule with propylene oxide and end capping of ethylene oxide, wherein the ethylene oxide content is in between 12.0 wt.-% to 15.0 wt.-% and (A2) the polymeric MDI having an isocyanate functionality in between 2.5 to 3.1, primarily based on 4,4'-MDI and containing oligomers of high functionality and isomers. The said isocyanate prepolymer having the isocyanate content in between 20 wt.-% to 23 wt.-%.

In another embodiment, the isocyanate prepolymer in the embodiment 1 further comprises suitable ingredients which may be added during or after the formation of the isocyanate prepolymer. Said otherwise, the mixture for obtaining the isocyanate prepolymer may comprise, in addition to the first polyether polyol and the polymeric isocyanate, surfactants and/or additives, as described herein. In a further embodiment, the isocyanate prepolymer in the embodiment 1 is obtained by mixing the first polyether polyol and the polymeric isocyanate, optionally in the presence of surfactants and/or additives, such as flame retardants. Suitable amounts of these ingredients are well known to the person skilled in the art, for instance, they may be present in an amount similar to their amount in the isocyanate reactive component, as described herein.

Isocyanate Reactive Component

In an embodiment, the isocyanate reactive component in the embodiment 1 comprises a mixture of (B1) 50 wt.-% to 90 wt.-% based on the total weight of the isocyanate reactive component of the second polyether polyol having the average functionality in between 1.9 to 3.5 and hydroxyl number in between 10 mg KOH/g to 40 mg KOH/g; (B2) 0.5 wt.-% to 30 wt.-% based on the total weight of the isocyanate reactive component of the third polyether polyol having the average functionality in between 1.9 to 8.0 and hydroxyl number in between 40 mg KOH/g to 1000 mg KOH/g; and at least one selected from crosslinkers, surfactants and catalysts. In another embodiment, the isocyanate reactive component in the embodiment 1 comprises a mixture of the second polyether polyol, the third polyether polyol, at least one selected from cross-linkers, surfactants and catalysts; and optionally additives.

Second Polyether Polyol

In one embodiment, the second polyether polyol in the embodiment 1 is same as the first poly-ether polyol. In another embodiment, the second polyether polyol may be different than the first polyether polyol.

Suitable second polyether polyols can be selected from the first polyether polyols, as described herein, and including a mixture thereof. In an embodiment, the second polyether polyol in the embodiment 1 has an average functionality in between 2.0 to 3.5, or in between 2.0 to 3.2, or in between 2.2 to 3.2, or in between 2.5 to 3.2, or in between 2.8 to 3.2. In another embodiment, the hydroxyl number is in between 15 mg KOH/g to 40 mg KOH/g, or in between 15 mg KOH/g to 35 mg KOH/g, or in between 20 mg KOH/g to 35 mg KOH/g, or in between 20 mg KOH/g to 32 mg KOH/g. In yet another embodiment, it is in between 25 mg KOH/g to 32 mg KOH/g.

In another embodiment, the second polyether polyol in the embodiment 1 has an average functionality of 3.0 and hydroxyl number in between 26 mg KOH/g to 30 mg KOH/g comprising glycerol as the starter molecule with propylene oxide and end capping of ethylene oxide, wherein the ethylene oxide content is in between 12.0 wt.-% to 15.0 wt.-%.

In one embodiment, the second polyether polyol in the embodiment 1 is present in an amount in between 55 wt.-% to 90 wt.-%, or in between 55 wt.-% to 85 wt.-%, or in between 60 wt.-% to 85 wt.-%, or in between 60 wt.-% to 80 wt.-%. In yet another embodiment, it is present in between 62 wt.-% to 80 wt.-%, or in between 62 wt.-% to 76 wt.-%.

Third Polyether Polyol

Suitable third polyether polyol in the embodiment 1 include conventional polyether polyols having the average functionality in between 1.9 to 8.0 and the hydroxyl number in between 40 mg KOH/g to 1000 mg KOH/g. In one embodiment, the average functionality is in between 1.9 to 7.5, or in between 1.9 to 6.0, or in between 1.9 to 5.5, or in between 1.9 to 5.0. In another embodiment, the average functionality is in between 1.9 to 4.5, or in between 2.0 to 4.5. The hydroxyl number of the third polyether polyol is in between 45 mg KOH/g to 1000 mg KOH/g, or in between 45 mg KOH/g to 950 mg KOH/g, or in between 50 mg KOH/g to 950 mg KOH/g, or in between 50 mg KOH/g to 900 mg KOH/g, or in between 50 mg KOH/g to 850 mg KOH/g.

Suitable third polyether polyols are obtainable by known methods, for example by anionic polymerization with alkali metal hydroxides, e.g., sodium hydroxide or potassium hydroxide, or alkali metal alkoxides, e.g., sodium methoxide, sodium ethoxide, potassium ethoxide or potassium isopropoxide, as catalysts and by adding at least one amine-containing starter molecule, or by cationic polymerization with Lewis acids, such as antimony pentachloride, boron fluoride etherate and so on, or fuller's earth, as catalysts from one or more alkylene oxides having 2 to 4 carbon atoms in the alkylene moiety.

Starter molecules are generally selected such that their average functionality is in between 2.0 to 8.0, or in between 3.0 to 8.0. Optionally, a mixture of suitable starter molecules is used.

Starter molecules for third polyether polyols include amine containing and hydroxyl-containing starter molecules. Suitable amine containing starter molecules include, for example, aliphatic and aromatic diamines such as ethylenediamine, propylenediamine, butylenediamine, hexamethylenediamine, phenylenediamines, toluenediamine, diaminodiphenylmethane and isomers thereof.

Other suitable starter molecules further include alkanolamines, e.g. ethanolamine, N-methylethanolamine and N-ethylethanolamines, dialkanolamines, e.g., diethanolamine, N-methyldiethanolamine and N-ethyldiethanolamine, and trialkanolamines, e.g., triethanolamine, and ammonia.

In one embodiment, amine containing starter molecules are selected from ethylenediamine, phenylenediamines, toluenediamine and isomers thereof. In other embodiment, the amine containing starter molecules comprise ethylenediamine.

Hydroxyl-containing starter molecules are selected from sugars, sugar alcohols, for e.g. glucose, mannitol, sucrose, pentaerythritol, sorbitol; polyhydric phenols, resols, e.g., oligomeric condensation products formed from phenol and formaldehyde, trimethylolpropane, glycerol, glycols such as ethylene glycol, propylene glycol and their condensation products such as polyethylene glycols and polypropylene glycols, e.g., diethylene glycol, triethylene glycol, dipropylene glycol, and water or a combination thereof.

In one embodiment, the hydroxyl-containing starter molecule is selected from sugar and sugar alcohols such as sucrose, sorbitol, glycerol, pentaerythritol, trimethylolpropane and mixtures thereof. In another embodiment, the hydroxyl-containing starter molecule is selected from sucrose, glycerol, pentaerythritol and trimethylolpropane.

Suitable alkylene oxides having 2 to 4 carbon atoms are, for example, ethylene oxide, propylene oxide, tetrahydrofuran, 1,2-butylene oxide, 2,3-butylene oxide and styrene oxide. Alkylene oxides can be used singly, alternatingly in succession or as mixtures. In one embodiment, the alkylene oxides are propylene oxide and/or ethylene oxide. In other embodiment, the alkylene oxides are mixtures of ethylene oxide and propylene oxide that comprise more than 50 wt.-% of propylene oxide.

In one embodiment, the third polyether polyol in the embodiment 1 is based on ethylenediamine with the average functionality of 4.0 and hydroxyl number of 800 mg KOH/g.

In yet another embodiment, the third polyether polyol in the embodiment 1 has an average functionality of 2.0 and hydroxyl number in between 53 mg KOH/g to 58 mg KOH/g comprising propylene glycol as the starter molecule and propylene oxide.

In another embodiment, a mixture of the third polyether polyols may also be used in the isocyanate reactive component in the embodiment 1.

In still another embodiment, the third polyether polyol in the embodiment 1 also includes other polyether polyols known to the person skilled in the art.

The third polyether polyol in the embodiment 1 is present in an amount in between 0.5 wt.-% to 26 wt.-% based on the total weight of the isocyanate reactive component.

Crosslinkers

In one embodiment, the isocyanate reactive component in the embodiment 1 comprises cross-linkers. Suitable cross-linkers are compounds containing at least two isocyanate reactive groups and having a molecular weight in between 100 g/mol to 150 g/mol. In another embodiment, the crosslinker has a molecular weight in between 100 g/mol to 125 g/mol.

In another embodiment, the crosslinker in the isocyanate reactive component in the embodiment 1 is selected from monoethanolamine, diethanolamine, triethanolamine, diethylene glycol, dipropylene glycol, glycerine, trimethylolpropane and pentaerythritol. In yet another embodiment, the crosslinker comprises diethylene glycol or dipropylene glycol.

In an embodiment, the crosslinker is present in the isocyanate reactive component in the embodiment 1 in an amount in between 0.5 wt.-% to 10.0 wt.-%, based on the total weight of the isocyanate reactive component (B). In another embodiment, it is present in between 0.5 wt.-% to 9.0 wt.-%, or in between 0.5 wt.-% to 8.0 wt.-%, or in between 0.5 wt.-% to 7.0 wt.-%. In yet another embodiment, it is present in between in between 0.5 wt.-% to 6.0 wt.-%, or in between 0.5 wt.-% to 5.0 wt.-%.

Surfactants

A variety of surfactants are known in the art and can be used in the present invention. One type of surfactant is a silicone based surfactant. Silicone based surfactants for the present invention are selected from hydrolysable polyether-polysiloxane block copolymers, non-hydrolysable polyether-polysiloxane block copolymers, cyanoalkylpolysiloxanes, polyether siloxane, polydimethylsiloxane, and polyether-modified dimethylpolysiloxane. In one embodiment, the surfactant in the isocyanate reactive component in the embodiment 1 comprises a polyether polysiloxane and/or polyether siloxane.

In another embodiment, the polyether polysiloxane is a polyether polysiloxane of general formula (I),

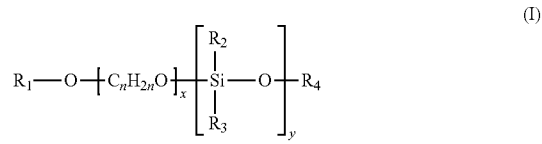

wherein,
$R_1$, $R_2$, $R_3$ and $R_4$ is, independent of each other, selected from alkyl, alkenyl, cycloalkyl, aryl, heteroaryl, alkylalkoxy, $R_9$—C(=O)—, $R_{10}$—NH—C(=O)—, $R_{11}$Si$(R_{12})(R_{13})$—, $R_{14}$—O—(—$R_{15}$—O—)$_j$—$(C_nH_{2n}$—)$_k$—;
$R_9$, $R_{10}$, $R_{11}$, $R_{12}$, and $R_{13}$ is, independent of each other, selected from alkyl, alkenyl, cycloalkyl, aryl, heteroaryl, alkylalkoxy;
$R_{14}$ and $R_{15}$ is, independent of each other, selected from bivalent alkylene, cycloalkylene, alkenyl, aryl;
n is an integer in between 1 to 10;
j and k is, independent of each other, an integer in between 0 to 10; and
x and y is, independent of each other, an integer in between 1 to 10000.

The term "alkyl" herein refers to an acyclic saturated aliphatic group including linear or branched alkyl saturated hydrocarbon radical denoted by a general formula $C_pH_{2p+1}$ and wherein p denotes the number of carbon atoms such as 1, 2, 3, 4 etc.

In one embodiment, alkyl refers to an unsubstituted, linear or branched, $C_1$-$C_{30}$ alkyl group. The unsubstituted linear $C_1$-$C_{30}$ alkyl is selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl, pentacosyl, hexacosyl, heptacosyl, octacosyl, nonacosyl and triacontyl. In another embodiment, it is selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl.

The term "alkenyl" refers to an unsubstituted, linear acyclic unsaturated aliphatic group including a linear alkenyl unsaturated hydrocarbon radical denoted by a general formula $C_pH_{2p-1}$ and wherein p denotes the number of carbon atoms such as 1, 2, 3, 4 etc.

In one embodiment, alkenyl refers to an unsubstituted linear $C_2$-$C_{30}$ alkenyl selected from 1-propenyl, 1-butenyl, 1-pentenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl, 1-octadecenyl, 2-octadecenyl, 1-nonadecenyl, 2-nonadecenyl, 1-eicosenyl, 2-eicosenyl, 2-henicosenyl, 2-docosenyl, 2-tricosenyl, 2-tetracosenyl, 2-pentacosenyl, 2-hexacosenyl, 2-octacoenyl, 2-nonacosenyl and 2-triacontenyl. In another embodiment, it is selected from 1-propenyl, 1-butenyl, 1-pentenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl, 2-pentadecenyl, 1-hexadecenyl, 2-hexadecenyl, 1-heptadecenyl, 2-heptadecenyl and 1-octadecenyl. In another embodiment, unsubstituted linear $C_2$-$C_{30}$ alkenyl selected from 1-propenyl, 1-butenyl, 1-pentenyl, 1-hexenyl, 2-hexenyl, 1-heptenyl, 2-heptenyl, 1-octenyl, 2-octenyl, 1-nonenyl, 2-nonenyl, 1-decenyl, 2-decenyl, 1-undecenyl, 2-undecenyl, 1-dodecenyl, 2-dodecenyl, 1-tridecenyl, 2-tridecenyl, 1-tetradecenyl, 2-tetradecenyl, 1-pentadecenyl and 2-pentadecenyl. In yet another embodiment, unsubstituted linear $C_2$-$C_{30}$ alkenyl selected from 1-propenyl, 1-butenyl, 1-pentenyl, 1-hexenyl, 2-hexenyl, 1-heptenyl and 2-heptenyl.

The term "cycloalkyl" refers to an unsubstituted or branched $C_3$-$C_{10}$ cycloalkyl having a monocyclic or bicyclic 3 to 10 membered saturated cycloaliphatic radical. The unsubstituted or branched $C_3$-$C_{10}$ cycloalkyl is a monocyclic or bicyclic $C_3$-$C_{10}$ compound. The representative examples of unsubstituted or branched $C_3$-$C_{10}$ monocyclic and bicyclic cycloalkyl is selected from cyclopropyl, cyclobutyl, cyclopentyl, cyclohexyl, cycloheptyl, bicyclo[2.2.1]heptyl and bicyclo[3.1.1]heptyl. The $C_3$-$C_{10}$ monocyclic and bicyclic cycloalkyl can be further branched with one or more equal or different alkyl groups, as described hereinabove. The representative examples of branched $C_3$-$C_{10}$ monocyclic and bicyclic cycloalkyl include, but are not limited to, methyl cyclohexyl, dimethyl cyclohexyl, etc.

The term "aryl" refers to a monocyclic, bicyclic or tricyclic hydrocarbon ring system having preferably 6 to 14 carbon atoms, wherein at least one carbocyclic ring is having a 4p+2π-electron system, wherein 'p' is the number of aromatic rings. An aryl moiety may be unsubstituted, monosubstituted or identically or differently polysubstituted. Examples of aryl moieties include, but are not limited to, phenyl, 1-naphthyl, 2-naphthyl or anthracenyl.

The term "heteroaryl" refers to an aromatic monocyclic, bicyclic or a tricyclic hydrocarbon having 6, 7, 8, 9, 10, 11, 12, 13 or 14 carbon atoms, or even 5, 6, 9 or 10 atoms, in which one to four carbon atoms are replaced by identical or different heteroatoms including oxygen, sulfur and nitrogen. Heteroaryl moieties may comprise 1, 2, 3, 4 or 5, or 1, 2, or 3, heteroatoms independently selected from oxygen, sulfur and nitrogen. A heteroaryl moiety may be unsubstituted or monosubstituted or identically or differently polysubstituted. Representative examples of suitable heteroaryl moieties are selected from furyl, pyridyl, oxazolyl, thiazolyl, pyrazolyl, pyrimidinyl, pyrrolyl, isooxazolyl, triazolyl, tetrazolyl, pyridazinyl, isothiazolyl, benzothiazolyl, benzooxazolyl, benzimidazolyl, quinolinyl and isoquinolinyl.

The term "alkylene" refers to acyclic saturated hydrocarbon chains, which combine different moieties. Representative examples of the alkylene groups are selected from —$CH_2$—$CH_2$—, —$CH_2$—$CH(CH_3)$—, —$CH_2$—CH($CH_2CH_3$)—, —$CH_2$—CH(n-$C_3H_7$)—, —$CH_2$—CH(n-$C_4H_9$)—, —$CH_2$—CH(n-$C_5H_{11}$)—, —$CH_2$—CH(n-$C_6H_{13}$)—, —$CH_2$—CH(n-$C_7H_{15}$)—, —$CH_2$—CH(n-$C_8H_{17}$)—, —CH($CH_3$)—CH($CH_3$)—, —($CH_2$)$_3$—, —($CH_2$)$_4$—, —($CH_2$)$_5$—, —($CH_2$)$_8$—, —($CH_2$)$_8$—, —($CH_2$)$_{10}$—, —C($CH_3$)$_2$—, —$CH_2$—C($CH_3$)$_2$—$CH_2$—, and —$CH_2$—[C($CH_3$)$_2$]$_2$—$CH_2$—.

In one embodiment, $C_2$-$C_{10}$ alkylene is selected from one or more of —$CH_2$—$CH_2$—, —$CH_2$—$CH(CH_3)$—, —$CH_2$—CH($CH_2CH_3$)—, —$CH_2$—CH(n-$C_3H_7$)—, —$CH_2$—CH(n-$C_4H_9$)—, —$CH_2$—CH(n-$C_6H_{13}$)—, and —($CH_2$)$_4$—.

In one embodiment, the polyether polysiloxane of general formula (I) is a polyether polysiloxane of general formula (I)(a),

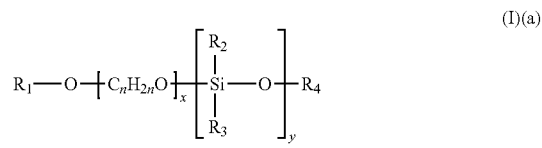

(I)(a)

wherein,
$R_1$, $R_2$, $R_3$ and $R_4$ is, independent of each other, selected from alkyl, alkenyl, $R_{14}$—O—(—$R_{15}$—O—)$_j$—($C_nH_{2n}$—)$_k$—;
$R_{14}$ and $R_{15}$ is, independent of each other, selected from bivalent alkylene, cycloalkylene, alkenyl, aryl;
n is an integer in between 1 to 10;
j and k is, independent of each other, an integer in between 0 to 10; and
z is an integer in between 1 to 10000.

In one embodiment, $R_2$ and $R_3$ is, independent of each other, an alkyl selected from methyl, ethyl, propyl, butyl, pentyl, hexyl, heptyl, octyl, nonyl and decyl. In another embodiment, it is selected from methyl, ethyl, propyl, butyl, pentyl and hexyl. In still another embodiment, $R_2$ and $R_3$ are identical and are selected from methyl, ethyl, propyl, butyl, pentyl and hexyl. In yet another embodiment, $R_2$ and $R_3$ comprise of methyl.

In another embodiment, n is an integer between 1 to 8, or in between 1 to 6, or even in between 1 to 4 in the general formula (I)(a).

In another embodiment, x and y are, independent of each other, an integer in between 1 to 10000, or in between 1 to 5000, or in between 1 to 1000, or in between 1 to 500, or in between 10 to 500, or even in between 10 to 250, or even still in between 10 to 100 in the general formula (I)(a).

In the present context, the concatenations denoted by x and y are distributed to form a block polymeric structure or a random polymeric structure, as is understood by the person skilled in the art.

In another embodiment, the non-ionic surfactant comprises a polyether siloxane represented by the general formula (II)

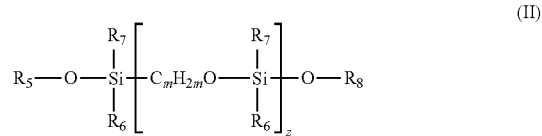

(II)

wherein,
$R_5$, $R_6$, $R_7$ and $R_8$ is, independent of each other, selected from alkyl, alkenyl, cycloalkyl, aryl, heteroaryl, alkylalkoxy, $R_9$—C(=)—, $R_{10}$—NH—C(=O)—, $R_{11}$Si($R_{12}$)($R_{13}$)—, $R_{14}$—O—(—$R_{15}$—O—)$_j$—($C_nH_{2n}$—)$_k$—;
$R_9$, $R_{10}$, $R_{11}$, $R_{12}$, and $R_{13}$ is, independent of each other, selected from alkyl, alkenyl, cycloalkyl, aryl, heteroaryl, alkylalkoxy;
$R_{14}$ and $R_{15}$ is, independent of each other, selected from bivalent alkylene, cycloalkylene, alkenyl, aryl;
m is an integer in between 1 to 10;

j and k is, independent of each other, an integer in between 0 to 10; and z is an integer in between 1 to 10000.

In one embodiment, the polyether siloxane is represented by the general formula (II)(a),

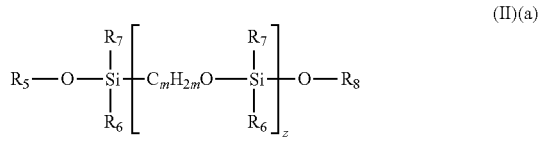

(II)(a)

wherein, $R_5$, $R_6$, $R_7$ and $R_8$ is, independent of each other, selected from alkyl, alkenyl, $R_{14}$—O—(—$R_{15}$—O—)$_j$—($C_nH_{2n}$—)$_k$—;

$R_{14}$ and $R_{15}$ is, independent of each other, selected from bivalent alkylene, cycloalkylene, alkenyl, aryl;

m is an integer in between 1 to 10;

j and k is, independent of each other, an integer in between 0 to 10; and z is an integer in between 1 to 10000.

Other surfactants that may be used in the present context include, such as but not limited to, salts of fatty acids, salts of sulfuric acid esters, salts of phosphoric acids esters and sulfonates.

In one embodiment, the surfactant is present in the isocyanate reactive component in the embodiment 1 in an amount in between 0.1 wt.-% to 10.0 wt.-% based on the total weight of the isocyanate reactive component. In another embodiment, it is present in between 0.1 wt.-% to 9.0 wt.-%, or in between 0.1 wt.-% to 8.0 wt.-%, or in between 0.1 wt.-% to 7.0 wt.-%, or in between 0.1 wt.-% to 6.0 wt.-%, or in between 0.1 wt.-% to 5.0 wt.-%, or in between 0.1 wt.-% to 4.0 wt.-%. In another embodiment, it is present in between 0.1 wt.-% to 3.0 wt.-%, or in between wt.-% to 3.0 wt.-%, or in between 0.5 wt.-% to 2.0 wt.-%.

In another embodiment, the surfactant may also be present in the isocyanate prepolymer component in the embodiment 1. If present, the amount of surfactant is in between 0.1 wt.-% to 10.0 wt.-% based on the total weight of the isocyanate prepolymer component. In another embodiment, it is present in between 0.1 wt.-% to 9.0 wt.-%, or in between 0.1 wt.-% to 8.0 wt.-%, or in between 0.1 wt.-% to 7.0 wt.-%, or in between 0.1 wt.-% to 6.0 wt.-%, or in between 0.1 wt.-% to wt.-%, or in between 0.1 wt.-% to 4.0 wt.-%. In another embodiment, it is present in between 0.1 wt.-% to 3.0 wt.-%, or in between 0.5 wt.-% to 3.0 wt.-%, or in between 0.5 wt.-% to 2.0 wt.-%.

Catalyst

In one embodiment, the isocyanate reactive component in the embodiment 1 comprises a catalyst. In another embodiment, the catalyst includes an amine catalyst. The amine catalyst is a tertiary amine catalyst.

Suitable catalyst in the embodiment 1 can be selected from trimethylamine, triethylamine, dimethylethanolamine, N-methylmorpholine, N,N-dimethylbenzylamine, N,N-dimethylethanolamine, N,N,N',N'-tetramethyle-1,4-butanediamine, N,N-dimethylpiperazine, bis(dimethylaminoethyl)ether, bis(2-dimethylaminoethyl) ether, morpholine,4,4'-(oxydi-2,1-ethanediyl)bis, triethylenediamine, pentamethyl diethylene triamine, dimethyl cyclohexyl amine, N-acetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) aminoethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, and 1,2-ethylene piperidine and methyl-hydroxyethyl piperazine, 1,4-diazabicyclo [2.2.2]octane-2-methanol and N-(3-dimethylaminopropyl)-N,N-diisopropanolamine.

In another embodiment, the catalyst is selected from trimethylamine, triethylamine, dimethylethanolamine, N-methylmorpholine, N,N-dimethylbenzylamine, N,N-dimethylethanolamine, N,N,N',N'-tetramethyle-1,4-butanediamine, N,N-dimethylpiperazine, bis(dimethylaminoethyl)ether, bis(2-dimethylaminoethyl) ether, morpholine,4,4'-(oxydi-2,1-ethanediyl)bis, triethylenediamine, pentamethyl diethylene triamine, dimethyl cyclohexyl amine, N-acetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) aminoethoxy ethanol, N,N,N',N'-tetramethyl hexane diamine, 1,8-di-azabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine) and (dimethyl(aminoethoxyethyl))((dimethyl amine)ethyl)ether.

In yet another embodiment, the catalyst is selected from trimethylamine, triethylamine, dimethylethanolamine, N-methylmorpholine, N,N-dimethylbenzylamine, N,N-dimethylethanolamine, N,N,N',N'-tetramethyle-1,4-butanediamine, N,N-dimethylpiperazine, bis(dimethylaminoethyl)ether, bis(2-di methylaminoethyl) ether, morpholine,4,4'-(oxydi-2,1-ethanediyl)bis, triethylenediamine, pentamethyl diethylene triamine, dimethyl cyclohexyl amine, N-acetyl N,N-dimethylamine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine and (N,N-dimethyl) amino-ethoxy ethanol.

In still another embodiment, the catalyst is selected from trimethylamine, triethylamine, dimethylethanolamine, N-methylmorpholine, N,N-dimethylbenzylamine, N,N-dimethylethanolamine, N,N,N',N'-tetramethyle-1,4-butanediamine, N,N-dimethylpiperazine, bis(dimethylaminoethyl)ether, bis(2-dimethylaminoethyl) ether, morpholine,4,4'-(oxydi-2,1-ethanediyl)bis, triethylenediamine, pentamethyl diethylene triamine and dimethyl cyclohexyl amine.

In another embodiment, the catalyst is selected from N,N,N',N'-tetramethyle-1,4-butanediamine, N,N-dimethylpiperazine, bis(dimethylaminoethyl)ether, bis(2-dimethylaminoethyl) ether, morpholine, 4,4'-(oxydi-2,1-ethanediyl) bis, triethylenediamine, pentamethyl diethylene triamine and dimethyl cyclohexyl amine.

In a further embodiment, the catalyst in the embodiment 1 comprises triethylenediamine.

Suitable amounts of the catalyst are well known to the person skilled in the art. However, in one embodiment, the catalyst in the embodiment 1 is present in an amount in between 0.01 wt.-% to wt.-% based on the total weight of the isocyanate reactive component. In another embodiment, it is present in between 0.01 wt.-% to 5.0 wt.-%, or in between 0.01 wt.-% to 4.5 wt.-%, or in between 0.05 wt.-% to 4.5 wt.-%. In still another embodiment, it is present in between 0.05 wt.-% to 4.0 wt.-%, or in between 0.1 wt.-% to 4.0 wt.-%, or in between 0.1 wt.-% to 3.5 wt.-%. In yet another embodiment, it is present in between 0.3 wt.-% to 3.5 wt.-%, or in between 0.3 wt.-% to 3.0 wt.-%, or in between 0.5 wt.-% to 3.0 wt.-%. In another embodiment, it is present in between 0.5 wt.-% to 2.5 wt.-%, or in between 0.5 wt.-% to 2.0 wt.-%.

Additive

In one embodiment, the isocyanate reactive component in the embodiment 1 further comprises at least one additive. Suitable additives can be selected from water scavengers, blowing agents, cell openers, flame retardants, dyes, pigments, IR absorbing materials, stabilizers, plasticizers, antistats, fungistats, bacterio-stats, hydrolysis controlling agents, curing agents, antioxidants, alkylene carbonates, carbonamides and pyrrolidones. The additives used herein are known and used in the polyurethane chemistry art for producing two-component polyurethane adhesive.

In one embodiment, the at least one additive is present in the isocyanate reactive component in the embodiment 1 in an amount in between 0.1 wt.-% to 20.0 wt.-% based on the total weight of the isocyanate reactive component.

In another embodiment, the at least one additive may also be present in the isocyanate prepolymer component in the embodiment 1. Suitable additives include compounds which do not react with the prepolymer component, such as but not limited to, water scavengers, blowing agents and flame retardants. If present, the amount of the additive is in between 0.1 wt.-% to 20.0 wt.-% based on the total weight of the isocyanate prepolymer component.

In one embodiment, the two-component PU foam adhesive in the embodiment 1, as described herein, is a low-rise PU foam adhesive. The low-rise PU foam adhesive can be used for draw down or pour-in-place as well as spray applications. The low-rise PU foam adhesives often behave as elastomers, particularly for draw down applications and therefore blowing agent (water) is not required. However, for spray applications, small amount of water as blowing agent may be added.

In one embodiment, the two-component PU foam adhesive in the embodiment 1 does not contain any blowing agent except water. Said otherwise, no chemical or physical blowing agent, except water, is introduced in either A-side and/or B-side.

The two-component PU foam adhesive in the embodiment 1, as described herein, is universally applicable, i.e. can be applied on a wide variety of substrates, is obtainable through multiple equipment configurations, has improved toughness and durability with acceptable mechanical properties. Particularly, the two-component PU foam adhesive has acceptable tear strength determined according to ASTM D-624, tensile strength and elongation at break, both determined according to ASTM D-638.

Process for Preparing the Two-Component PU Foam Adhesive

Another aspect of the present invention is embodiment 2, directed to a process for preparing the two-component PU foam adhesive of the embodiment 1 by mixing the isocyanate prepolymer component (A) with the isocyanate reactive component (B) at an isocyanate index in between 70 to 200.

In one embodiment, the isocyanate prepolymer component (A) and the isocyanate reactive component (B) in the embodiment 2 are mixed at an index in between 70 to 180. In another embodiment, the index is in between 80 to 180, or 80 to 160. In yet another embodiment, the index is in between 90 to 160, or 90 to 150, or 100 to 150. In still another embodiment, the index is in between 100 to 130, or 105 to 130. The isocyanate index describes the molar ratio of NCO groups to isocyanate reactive groups. An index of 100 relates to the ratio of 1:1.

In another embodiment, the embodiment 2 comprises the following sub steps:
(S1) preparing the isocyanate prepolymer component by mixing the at least one first polyether polyol and the at least one polymeric isocyanate at an isocyanate content in between 15 wt.-% to 28 wt.-%,
(S2) mixing the isocyanate reactive component with the isocyanate prepolymer component to obtain a reaction mixture, and
(S3) spraying or pouring the reaction mixture on at least one substrate layer and allowing it to cure.

In another embodiment, mixing in the embodiment 1 can be carried out using suitable mixing devices. Suitable mixing devices for the purpose of the present invention are known to the person skilled in the art, for example, a mixing head. In one embodiment, the isocyanate prepolymer component and the isocyanate reactive component are fed as separate streams into the mixing device. The streams are mixed in the mixing device and the reaction mixture is thus obtained. While it is preferred that each stream enters separately in the mixing device, it is possible that the isocyanate prepolymer component and the isocyanate reactive component are well mixed by suitable mixing means, for example, a static mixer or a dynamic mixer. Moreover, the mixing can be continuous or discontinuous.

In another embodiment, the mixing in the embodiment 2, as described herein, can be controlled by suitable means known to the person skilled in the art, for instance by simply switching on and off or even by a process control software equipped with flow meters, so that parameters, such as mixing ratio, temperature and pressure can be controlled.

Other suitable techniques, such as the ones described in WO2019/089237 A1, may also be used to obtain the two-component PU foam adhesive in the embodiment 2.

Suitable mixing temperature are well known to the person skilled in the art. However, in one embodiment, the mixing in the embodiment 2 is carried out at a temperature in between 30° C. to 120° C. Similarly, the curing of the reaction mixture is carried out at room temperature. By "room temperature", it is referred to a temperature of 25° C.

In another embodiment, the isocyanate prepolymer component (A) and the isocyanate reactive component (B) are mixed in the embodiment 2 at a mix ratio (A):(B) in between 1.0:4.0 to 4.0:1.0. The mix ratio is determined as the weight ratio between the isocyanate prepolymer component (A) and the isocyanate reactive component (B). In one embodiment, the ratio is in between 1.0:3.0 to 3.0:1.0. In another embodiment, it is 1.0:3.0.

In one embodiment, the mix ratio (A):(B), by volume, is in between 1.0:4.0 to 4.0:1.0. In another embodiment, the mix ratio (A):(B), by volume, is 1.0:1.0.

Since the present invention two-component PU foam adhesive in the embodiment 1 or as obtained according to embodiment 2 is obtainable through multiple equipment configurations, the mixing can be carried out at pressure ranging between 0.1 MPa to 10 MPa. The two-component PU foam adhesive can thus be easily used for spray applications or draw down applications and suitable pressure range be chosen therefor.

Article

Another aspect of the present invention is embodiment 3, directed to an article comprising at least one first substrate layer and one second substrate layer, wherein the two-component PU foam adhesive of the embodiment 1 or as obtained according to embodiment 2 is present in between the first substrate layer and the second substrate layer of the article and forms an adhesive bond between them.

In one embodiment, the first substrate layer and the second substrate layer, independent of each other, is selected from wood, ceramics, steel, paper, fabric, non-woven fabric, concrete and polymeric material. Since the two-component PU foam adhesive can be applied for a wide variety of applications and is easily obtainable using multiple equipment configurations, the substrate layers can be chosen based on the intended application.

In one embodiment, the first substrate layer is same as the second substrate layer in the embodiment 3. In another embodiment, the first substrate layer and the second substrate layer in the embodiment 3 are different. In another embodiment, multiple layers of each first substrate layer and second substrate layers may also be connected using the two-component PU foam adhesive, as described herein.

Suitable articles that can be obtained using the two-component PU foam adhesive include, such as but not limited to, roof structures. In one embodiment, the roof structure is selected from board-to-board (for e.g. oriented strand board (OSB), gypsum, plywood, fiberboard, high density board, board stock, polyisocyanurate (PIR), expanded polystyrene (EPS), extruded polystyrene (XPS) and Neopore) and board-to-fleece-modified membranes (for e.g. ethylene propylene diene terpolymer (EPDM), thermoplastic olefin (TPO) and polyvinyl chloride (PVC)).

The article in the embodiment 3 may be obtained at the installation site itself by spraying or pouring the two-component PU foam adhesive. For instance, the article can be obtained by pouring or spraying the two-component PU foam adhesive onto the substrate layers and allowing sufficient time for curing the same. Once the adhesive is cured, the resulting article is durable and tough and has the required strength that enables it to withstand adverse conditions.

Method for Producing Article

Another aspect of the present invention is embodiment 4, directed to a method for producing an article, as described in the embodiment 3, said method comprising the steps of:
(S1) applying the two-component PU foam adhesive at least partially onto the at least one first substrate layer, and
(S2) applying the second substrate layer onto the at least one first substrate layer and allowing the two-component polyurethane foam adhesive to solidify to obtain the article.

Suitable techniques for applying the two-component PU foam adhesive onto the at least one first substrate layer are well known to the person skilled in the art. For instance, a roller, squeegee, brush, doctor blade, air knife, vibrator, gravity, ultrasonic, spray nozzle or multiple dispensing nozzles may be used to apply the two-component PU foam adhesive onto the at least one first substrate layer in the embodiment 4.

In one embodiment, the two-component PU foam adhesive in the embodiment 4 is applied at least partially onto the first substrate layer. In another embodiment, the at least one first substrate layer in the embodiment 4 is completely covered with the two-component PU foam adhesive.

In another embodiment, the second substrate layer is applied onto the first substrate layer in the embodiment 4 and provided with sufficient time for the two-component PU foam adhesive to solidify or cure. In one embodiment, the curing of the adhesive takes place at room temperature, with the solidification time ranging between 1 min to 15 mins. By "solidification time", it is referred to the time taken by the adhesive to finally cure and bond the substrates.

Alternatively, the second substrate layer in the embodiment 4 may also be at least partially covered with the two-component PU foam adhesive and then applied onto the first substrate layer to obtain the article.

The present invention is illustrated in more detail by the following embodiments and combinations of embodiments which result from the corresponding dependency references and links:

I. A two-component polyurethane foam adhesive comprising:
(A) an isocyanate prepolymer component, obtained by mixing
(A1) at least one first polyether polyol having an average functionality in between 1.9 to 3.5 and a hydroxyl number in between 10 mg KOH/g to 100 mg KOH/g, and
(A2) at least one polymeric isocyanate,
wherein the isocyanate prepolymer has an isocyanate content in between 15 wt.-% to 28 wt.-%, and
(B) an isocyanate reactive component comprising
(B1) 50 wt.-% to 90 wt.-% based on the total weight of the isocyanate reactive component of a second polyether polyol having an average functionality in between 1.9 to 3.5 and a hydroxyl number in between 10 mg KOH/g to 40 mg KOH/g, and
(B2) 0.5 wt.-% to 30 wt.-% based on the total weight of the isocyanate reactive component of a third polyether polyol having an average functionality in between 1.9 to 8.0 and a hydroxyl number in between 40 mg KOH/g to 1000 mg KOH/g.

II. The two-component polyurethane foam adhesive according to embodiment I, wherein the isocyanate prepolymer has an isocyanate content in between 20 wt.-% to 23 wt.-%.

III. The two-component polyurethane foam adhesive according to embodiment I or II, wherein the at least one first polyether polyol comprises at least one alkylene oxide capped polyether polyol.

IV. The two-component polyurethane foam adhesive according to embodiment III, wherein the at least one alkylene oxide capped polyether polyol has an alkylene oxide content of less than wt.-% based on the total weight of the alkylene oxide capped polyether polyol.

V. The two-component polyurethane foam adhesive according to embodiment III or IV, wherein the alkylene oxide content is in between 5.0 wt.-% to 25.0 wt.-%.

VI. The two-component polyurethane foam adhesive according to one or more of embodiments III to V, wherein the alkylene oxide comprises propylene oxide and/or ethylene oxide.

VII. The two-component polyurethane foam adhesive according to one or more of embodiments I to VI, wherein the polymeric isocyanate has an isocyanate functionality in between 2.5 to 4.0.

VIII. The two-component polyurethane foam adhesive according to one or more of embodiments I to VII, wherein the polymeric isocyanate comprises polymeric methylene diphenyl diisocyanate.

IX. The two-component polyurethane foam adhesive according to one or more of embodiments 1 to VIII, wherein the second polyether polyol has an average functionality in between 2.0 to 3.5 and a hydroxyl number in between 20 mg KOH/g to 40 mg KOH/g.

X. The two-component polyurethane foam adhesive according to one or more of embodiments I to IX, wherein the second polyether polyol is present in an amount in between 60 wt.-% to 80 wt.-% based on the total weight of the isocyanate reactive component.

XI. The two-component polyurethane foam adhesive according to one or more of embodiments I to X, wherein the second polyether polyol comprises an alkylene oxide capped polyether polyol having an alkylene oxide content of less than 25.0 wt.-% based on the total weight of the alkylene oxide capped polyether polyol.

XII. The two-component polyurethane foam adhesive according to embodiment XI, wherein the alkylene oxide content is in between 5.0 wt.-% to 25.0 wt.-%.

XIII. The two-component polyurethane foam adhesive according to embodiment XI or XII, wherein the alkylene oxide comprises propylene oxide or ethylene oxide.

XIV. The two-component polyurethane foam adhesive according to one or more of embodiments I to XIII, wherein the third polyether polyol has an average functionality in between 1.9 to 5.0 and a hydroxyl number in between 50 mg KOH/g to 900 mg KOH/g.

XV. The two-component polyurethane foam adhesive according to one or more of embodiments I to XIV, wherein the isocyanate reactive component further comprises at least one selected from crosslinkers, surfactants and catalysts.

XVI. The two-component polyurethane foam adhesive according to embodiment XV, wherein the crosslinker comprises a compound containing at least two isocyanate reactive groups and having a molecular weight in between 30 g/mol to 150 g/mol.

XVII. The two-component polyurethane foam adhesive according to embodiment XV or XVI, wherein the crosslinker comprises a compound containing at least two isocyanate reactive groups and having a molecular weight in between 100 g/mol to 150 g/mol.

XVIII. The two-component polyurethane foam adhesive according to one or more of embodiments XV to XVII, wherein the crosslinker is selected from monoethanolamine, diethanolamine, triethanolamine, diethylene glycol, dipropylene glycol, glycerine, trimethylolpropane and pentaerythritol.

XIX. The two-component polyurethane foam adhesive according to one or more of embodiments XV to XVIII, wherein the crosslinker is present in an amount in between 0.5 wt.-% to 10.0 wt.-% based on the total weight of the isocyanate reactive component.

XX. The two-component polyurethane foam adhesive according to one or more of embodiments XV to XIX, wherein the crosslinker is present in an amount in between 0.5 wt.-% to 5.0 wt.-% based on the total weight of the isocyanate reactive component.

XXI. The two-component polyurethane foam adhesive according to one or more of embodiments XV to XX, wherein the surfactant comprises polyether polysiloxane and/or polyether siloxane.

XXII. The two-component polyurethane foam adhesive according to one or more of embodiments XV to XXI, wherein the surfactant is present in an amount in between 0.1 wt.-% to 10.0 wt.-% based on the total weight of the isocyanate reactive component.

XXIII. The two-component polyurethane foam adhesive according to one or more of embodiments XV to XXII, wherein the surfactant is present in an amount in between 0.1 wt.-% to 5.0 wt.-% based on the total weight of the isocyanate reactive component.

XXIV. The two-component polyurethane foam adhesive according to one or more of embodiments XV to XXIII, wherein the catalyst comprises an amine catalyst.

XXV. The two-component polyurethane foam adhesive according to embodiment XXIV, wherein the amine catalyst is a tertiary amine catalyst.

XXVI. The two-component polyurethane foam adhesive according to one or more of embodiments XV to XXV, wherein the catalyst is selected from trimethylamine, triethylamine, dimethylethanolamine, N-methylmorpholine, N,N-dimethylbenzylamine, N,N-dimethylethanolamine, N,N,N',N'-tetramethyle-1,4-butanediamine, N,N-dimethylpiperazine, bis(dimethylaminoethyl)ether, bis(2-dimethylaminoethyl)ether, morpholine,4,4'-(oxydi-2,1-ethanediyl)bis, triethylenediamine, pentamethyl diethylene triamine, dimethyl cyclohexyl amine, N-acetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethyl-aminopropyl)N-isopropanolamine, (N,N-dimethyl) amino-ethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, and 1,2-ethylene piperidine and methyl-hydroxyethyl piperazine, 1,4-diazabicyclo[2.2.2]octane-2-methanol and N-(3-dimethylaminopropyl)-N,N-diisopropanolamine.

XXVII. The two-component polyurethane foam adhesive according to one or more of embodiments XV to XXVI, wherein the catalyst is present in an amount in between 0.01 wt.-% to 5.0 wt.-% based on the total weight of the isocyanate reactive component.

XXVIII. The two-component polyurethane foam adhesive according to one or more of embodiments I to XXVII, wherein the isocyanate reactive component further comprises at least one additive.

XXIX. The two-component polyurethane foam adhesive according to embodiment XXVIII, wherein the at least one additive is selected from water scavengers, blowing agents, cell openers, flame retardants, dyes, pigments, IR absorbing materials, stabilizers, plasticizers, antistats, fungistats, bacterio-stats, hydrolysis controlling agents, curing agents, antioxidants, alkylene carbonates, carbonamides and pyrrolidones.

XXX. The two-component polyurethane foam adhesive according to embodiment XXVIII or XXIX, wherein the at least one additive is present in an amount in between 0.1 wt.-% to 20.0 wt.-% based on the total weight of the isocyanate reactive component.

XXXI. A process for preparing a two-component polyurethane foam adhesive according to one or more of embodiments I to XXX by mixing the isocyanate prepolymer component (A) with the isocyanate reactive component (B) at an isocyanate index in between 70 to 200.

XXXII. The process according to embodiment XXXI, wherein the mixing is carried out at a pressure ranging between 0.1 MPa to 10 MPa.

XXXIII. An article comprising at least one first substrate layer and one second substrate layer, wherein a two-component polyurethane foam adhesive layer according to one or more of embodiments Ito XXX or as obtained according to embodiments XXXI or XXXII is present in between the first substrate layer and the second substrate layer of the article and forms an adhesive bond between them.

XXXIV. The article according to embodiment XXXIII, wherein at least one of the first substrate layer and the second substrate layer, independent of each other, is selected from wood, ceramics, steel, paper, fabric, non-woven fabric, concrete and polymeric material.

XXXV. The article according to embodiment XXXIII or XXXIV, wherein the article is a roof structure.

XXXVI. A method for producing an article according to one or more of embodiments XXXIII to XXXV, said method comprising the steps of:
- (S1) applying the two-component polyurethane foam adhesive at least partially onto the at least one first substrate layer, and
- (S2) applying the second substrate layer onto the at least one first substrate layer and allowing the two-component polyurethane foam adhesive to solidify to obtain the article.

XXXVII. The method according to embodiment XXXVII, wherein in step (S2) the two-component polyurethane foam adhesive has a solidification time in between 1 min to 15 min.

EXAMPLES

The presently claimed invention is illustrated by the non-restrictive examples which are as follows:

Compounds

| First polyether polyol (FP) | FP1: Glycerol and propylene oxide based polyether polyol with ethylene oxide end capping at 13.6 wt.-% having an average functionality of 3.0 and hydroxyl number in between 26.0 mg KOH/g to 30.0 mg KOH/g, obtained from BASF |
| --- | --- |
| | FP2: Propylene glycol and propylene oxide based polyether polyol with ethylene oxide end capping at 21.0 wt.-% having an average functionality of 2.0 and hydroxyl number in between 28 mg KOH/g to 30 mg KOH/g, obtained from BASF |
| Second polyether polyol (SP) | Glycerol and propylene oxide based polyether polyol with ethylene oxide end capping at 13.6 wt.-% having an average functionality of 3.0 and hydroxyl number in between 26.0 mg KOH/g to 30.0 mg KOH/g, obtained from BASF |
| Third polyether polyol (TP) | TP1: Polyether polyol based on ethylenediamine with average functionality of 4.0 and hydroxyl number of 800 mg KOH/g, obtained from Carpenter Co. |
| | TP2: Propylene glycol and propylene oxide based polyether polyol having an average functionality of 2.0 and hydroxyl number in between 53 mg KOH/g to 58 mg KOH/g, obtained from BASF |

| Polymeric isocyanate (PI) | Polymeric methylene diphenyl diisocyanate having an average functionality of 2.7, obtained from BASF |
| --- | --- |
| Crosslinker (CL) | Diethylene glycol |
| Surfactant (SU) | Polyether polydimethylsiloxane copolymer obtained from Evonik |
| Catalyst (Cat) | Cat1: Solution of triethylenediamine in dipropylene glycol |
| | Cat2: N,N-Dimethylethanolamine |
| | Cat3: N,N-Dimethylcyclohexyl-amine |
| Additive (AD) | AD1: tris(2-chloropropyl)phosphate as flame retardant |
| | AD2: Molecular sieves as water scavenger |
| | AD3: Water as blowing agent |
| | AD4: Tetrabromophthalate diol as flame retardant |

Standard Methods

| Tensile strength | ASTM D-638 |
| --- | --- |
| Elongation at break | ASTM D-638 |
| Tear strength | ASTM D-624 |

General Synthesis of the Isocyanate Prepolymer Component

The aforementioned ingredients were used to obtain the prepolymer component. The ingredients were mixed in a 7 gallon reactor and heated to 60° C. The isocyanate was added first and while agitating the first polyether polyol was added. The temperature here was maintained below 80° C. After addition of the first polyether polyol, the reactor was set to 80° C. for 1 h and 45 min, under nitrogen atmosphere. The resulting prepolymer was then cooled to 40° C. and discharged into containers. A summary of the ingredients used and their amounts (all in wt.-%) is mentioned in Table 1.

TABLE 1

Inventive isocyanate prepolymer components

| Ingredients | IP 1 | IP 2 | IP 3 | IP 4 | IP 5 | Comp. iso. 1 |
| --- | --- | --- | --- | --- | --- | --- |
| PI | 78.43 | 69.8 | 78.35 | 75 wt. % [prepolymer comprising 2,4'- | 50 wt. % [prepolymer comprising 2,4'- | 100 |
| FP1 | — | — | 21.65 | | | — |
| FP2 | 21.57 | 19.2 | — | | | — |
| SP | — | — | — | MDI + 4,4'- | MDI + 4,4'- | — |
| TP1 | — | — | — | MDI and | MDI and | — |
| TP2 | — | — | — | TP2 + FP1] + 25 wt.-% IP 3 | TP2 + FP1] + 50 wt.-% IP 3 | — |

General Synthesis of Reaction Mixture

The aforementioned isocyanate prepolymer components (A) were mixed with the isocyanate reactive components (B) at an index of 120. The reaction mixture was obtained at a mix ratio of 1.0:3.0 (A:B), by weight. A summary of the ingredients used and their amounts (all in wt.-%) is mentioned in Table 2.

TABLE 2

Inventive and comparative reaction mixture

| Ingredients | IE 1 | IE 2 | IE 3 | IE 4 | IE 5 | CE 1 |
|---|---|---|---|---|---|---|
| ISOCYANATE PREPOLYMER COMPONENT | | | | | | |
| IP 1 | 100 | — | — | — | — | 100 wt.-% comp. iso. 1 |
| IP 2 | — | 94 | — | — | — | |
| IP 3 | — | — | 100 | — | — | |
| IP 4 | — | — | — | 89 | — | |
| IP 5 | — | — | — | — | 89 | |
| SU | — | 1.0 | — | 1.0 | 1.0 | |
| AD1 | — | 5.0 | — | 10 | 10 | |
| FP1 | — | — | — | — | — | |
| FP2 | — | — | — | — | — | |
| SP | 66 | 63 | 66 | 74.4 | 74.4 | |
| TP1 | — | — | — | 1.0 | 1.0 | |
| TP2 | 25 | 23 | 25 | — | — | 20 |
| Pluracol GP730 | | | | | | 56 |
| CL | 4.0 | 4.0 | 4.0 | 1.0 | 1.0 | 10 |
| SU | 1.0 | 1.0 | 1.0 | 1.0 | 1.0 | — |
| Dabco DC 5604 | — | — | — | — | — | 1.0 |
| Cat1 | 1.0 | 1.0 | 1.0 | 2.0 | 2.0 | 0.35 |
| Cat2 | — | — | — | — | — | 0.75 |
| Cat3 | — | — | — | — | — | 0.30 |
| AD1 | — | 5.0 | — | 8.5 | 8.5 | 9.0 |
| AD2 | 3.0 | 3.0 | 3.0 | — | — | — |
| AD3 | — | — | — | 3.6 | 3.6 | 2.6 |
| AD4 | — | — | — | 8.5 | 8.5 | — |

Spray Application

The aforementioned reaction mixture, particularly IE 4 and IE 5, were sprayed on polyethylene boards having dimensions of 16 inch×16 inch. Polyethylene was used to ensure the adhesive could be easily removed after curing. The spray was completed using a Graco E-30 proportioner with an attached Fusion spray gun. Machine spray pressures were set at 6.89 MPa, with the reaction mixture temperature at 54.4° C.

Draw Down Application

IE 1, IE 2 and IE 3 were applied on polyethylene sheets using a KTQ-II Adjustable Film Applicator. The isocyanate prepolymer component (A) and the isocyanate reactive component (B) of the inventive examples were weighed separately, mixed together at high speed, and the mixture poured onto the polyethylene sheet. Before the mixture could fully cure, the KTQ-II was used to draw the material across the polyethylene to create an even sample.

The adhesives, both from spray application and draw down application, were tested for their mechanical properties. Summary of the test results is mentioned in Table 3.

TABLE III

Mechanical properties of the adhesive

| Property | IE 1 | IE 2 | IE 3 | IE 4 | IE 5 | CE 1 |
|---|---|---|---|---|---|---|
| Tensile strength (MPa) | 1.65 | 1.05 | 1.48 | 0.36 | 0.32 | 0.61 |
| Elongation at break (%) | 0.43 | 0.29 | 0.40 | 0.18 | 0.11 | 0.65 |
| Tear strength (MPa) | 0.19 | 0.18 | 0.20 | 0.08 | 0.08 | 0.16 |

As evident above, the present invention adhesive has acceptable properties, particularly those of tensile strength, elongation at break and tear strength, in comparison with the commercially available non-prepolymer grade (CE 1). Moreover, the present invention adhesive has improved toughness and is durable enough to be used on a wide variety of substrates and can be easily obtained through multiple equipment configurations, such as by spraying or pouring.

The invention claimed is:

1. A two-component polyurethane foam adhesive, comprising:
   (A) an isocyanate prepolymer component, obtained by mixing
      (A1) at least one first polyether polyol having an average functionality in between 1.9 to 3.5 and a hydroxyl number in between 10 mg KOH/g to 100 mg KOH/g, and
      (A2) at least one polymeric isocyanate,
   wherein the isocyanate prepolymer has an isocyanate content in between 15 wt.-% to 28 wt.-%, and
   (B) an isocyanate reactive component comprising
      (B1) 50 wt.-% to 90 wt.-% based on a total weight of the isocyanate reactive component of a second polyether polyol having an average functionality in between 1.9 to 3.5 and a hydroxyl number in between 10 mg KOH/g to 40 mg KOH/g, and
      (B2) 0.5 wt.-% to 30 wt.-% based on the total weight of the isocyanate reactive component of one of a third polyether polyol having an average functionality in between 1.9 to 8.0 and a hydroxyl number in between 40 mg KOH/g to 1000 mg KOH/g.

2. The two-component polyurethane foam adhesive according to claim 1, wherein the at least one first polyether polyol comprises at least one alkylene oxide capped polyether polyol.

3. The two-component polyurethane foam adhesive according to claim 2, wherein the at least one alkylene oxide capped polyether polyol has an alkylene oxide content of less than 25.0 wt.-% based on a total weight of the alkylene oxide capped polyether polyol.

4. The two-component polyurethane foam adhesive according claim 1, wherein the polymeric isocyanate comprises polymeric methylene diphenyl diisocyanate.

5. The two-component polyurethane foam adhesive according to claim 1, wherein the second polyether polyol comprises an alkylene oxide capped polyether polyol having an alkylene oxide content of less than 25.0 wt.-% based on a total weight of the alkylene oxide capped polyether polyol.

6. The two-component polyurethane foam adhesive according to claim 5, wherein the isocyanate reactive component further comprises at least one selected from the group consisting of crosslinkers, surfactants and catalysts.

7. The two-component polyurethane foam adhesive according to claim 1, wherein the isocyanate reactive component further comprises at least one additive.

8. The two-component polyurethane foam adhesive according to claim 7, wherein the at least one additive is at least one selected from the group consisting of water scavengers, blowing agents, cell openers, flame retardants, dyes, pigments, IR absorbing materials, stabilizers, plasticizers, antistats, fungistats, bacteria-stats, hydrolysis controlling agents, curing agents, antioxidants, alkylene carbonates, carbonamides and pyrrolidones.

9. A process for preparing a two-component polyurethane foam adhesive according to claim 1, the process comprising mixing the isocyanate prepolymer component (A) with the isocyanate reactive component (B) at an isocyanate index in between 70 to 200.

10. An article, comprising at least one first substrate layer and one second substrate layer, wherein a two-component polyurethane foam adhesive layer according to claim 1 is present in between the first substrate layer and the second substrate layer of the article and forms an adhesive bond between them.

11. The article according to claim 10, wherein at least one of the first substrate layer and the second substrate layer, independent of each other, is selected from the group consisting of wood, ceramics, steel, paper, fabric, non-woven fabric, concrete and polymeric material.

12. A method for producing an article according to claim 10, said method comprising the steps of:
(S1) applying the two-component polyurethane foam adhesive at least partially onto the at least one first substrate layer, and
(S2) applying the second substrate layer onto the at least one first substrate layer and allowing the two-component polyurethane foam adhesive to solidify to obtain the article.

13. An article, comprising at least one first substrate layer and one second substrate layer, wherein a two-component polyurethane foam adhesive layer as obtained according to claim 9 is present in between the first substrate layer and the second substrate layer of the article and forms an adhesive bond between them.

14. The article according to claim 13, wherein at least one of the first substrate layer and the second substrate layer, independent of each other, is selected from the group consisting of wood, ceramics, steel, paper, fabric, non-woven fabric, concrete and polymeric material.

15. A method for producing an article according to claim 11, said method comprising the steps of:
(S1) applying the two-component polyurethane foam adhesive at least partially onto the at least one first substrate layer, and
(S2) applying the second substrate layer onto the at least one first substrate layer and allowing the two-component polyurethane foam adhesive to solidify to obtain the article.

16. A method for producing an article according to claim 13, said method comprising the steps of:
(S1) applying the two-component polyurethane foam adhesive at least partially onto the at least one first substrate layer, and
(S2) applying the second substrate layer onto the at least one first substrate layer and allowing the two-component polyurethane foam adhesive to solidify to obtain the article.

17. A method for producing an article according to claim 14, said method comprising the steps of:
(S1) applying the two-component polyurethane foam adhesive at least partially onto the at least one first substrate layer, and
(S2) applying the second substrate layer onto the at least one first substrate layer and allowing the two-component polyurethane foam adhesive to solidify to obtain the article.

* * * * *